United States Patent
Chao et al.

(10) Patent No.: US 8,294,951 B2
(45) Date of Patent: Oct. 23, 2012

(54) METHOD OF REDUCING THE AMOUNT OF BLACK IN AN IMAGE

(75) Inventors: Kuan-Li Chao, Taipei (TW); Chun-Chieh Huang, Taipei (TW); Kun-Yi Hua, Taipei (TW); Mardianto Soebagio Hadiputro, Taipei (TW); Hwa-Pey Wang, Taipei (TW); Chih-Kang Yang, Taipei (TW); Kuo-Ping Yang, Taipei (TW); Sin-Chen Lin, Taipei (TW)

(73) Assignee: Kuo-Ping Yang, Taipei (TW)

( * ) Notice: Subject to any disclaimer, the term of this patent is extended or adjusted under 35 U.S.C. 154(b) by 322 days.

(21) Appl. No.: 12/656,928

(22) Filed: Feb. 19, 2010

(65) Prior Publication Data
US 2011/0205562 A1 Aug. 25, 2011

(51) Int. Cl.
*H04N 1/60* (2006.01)

(52) U.S. Cl. ...... 358/1.9; 358/1.18; 358/3.11; 358/3.12; 358/3.26; 358/3.27; 358/500; 358/501; 358/502; 382/166; 382/167; 345/60; 345/102; 345/204; 345/215; 347/14; 347/15; 347/16; 347/43

(58) Field of Classification Search .................. None
See application file for complete search history.

(56) References Cited

U.S. PATENT DOCUMENTS

| 4,590,515 | A | * | 5/1986 | Wellendorf | 358/500 |
| 6,091,513 | A | * | 7/2000 | Ishihara et al. | 358/1.9 |
| 6,336,705 | B1 | * | 1/2002 | Torigoe | 347/43 |
| 6,791,714 | B1 | * | 9/2004 | Ishimura | 358/1.9 |
| 7,036,907 | B2 | * | 5/2006 | Jung et al. | 347/43 |
| 7,136,083 | B2 | * | 11/2006 | Tezuka et al. | 345/690 |
| 7,158,148 | B2 | * | 1/2007 | Toji et al. | 345/613 |
| 2005/0212926 | A1 | * | 9/2005 | Min et al. | 348/222.1 |
| 2010/0195159 | A1 | * | 8/2010 | Kondo | 358/3.01 |

* cited by examiner

*Primary Examiner* — Dung Tran
(74) *Attorney, Agent, or Firm* — Bacon & Thomas, PLLC

(57) ABSTRACT

A method of reducing the amount of black in an image is disclosed. The method is using a computer to reduce the amount of or eliminate the black in an original digital image. The major procedure is to increase the pixels of the original digital image (by four or nine times) and then change the color information of the pixels.

11 Claims, 8 Drawing Sheets

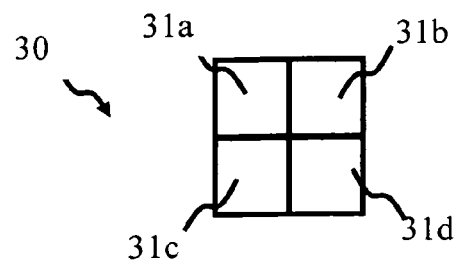
FIG. 4
|  | R | G | B |
|---|---|---|---|
| 31a, | 22 | 20 | 30 |
| 31b | 200 | 190 | 0 |
| 31c | 15 | 200 | 245 |
| 31d | 35 | 80 | 90 |
FIG. 5
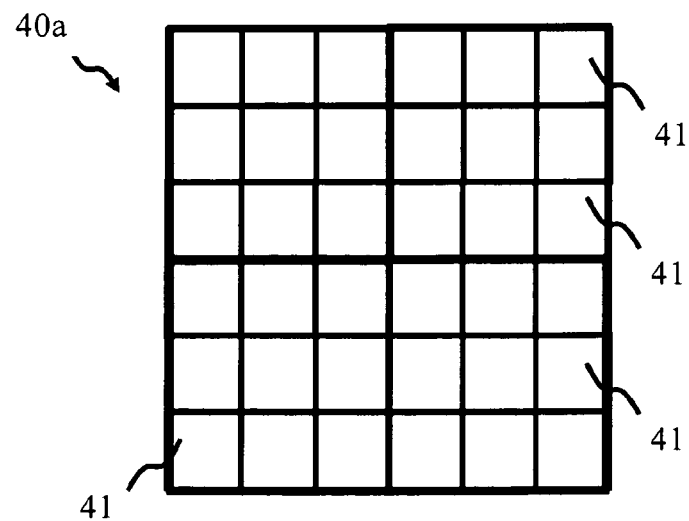
FIG. 6

|      | R   | G   | B   |
|------|-----|-----|-----|
| 31a, | 20  | 15  | 30  |
| 41a  | 255 | 255 | 30  |
| 41b  | 20  | 255 | 255 |
| 41c  | 255 | 15  | 255 |
| 41d  | 20  | 255 | 255 |
| 41e  | 255 | 15  | 255 |
| 41f  | 255 | 255 | 30  |
| 41g  | 255 | 15  | 255 |
| 41h  | 255 | 255 | 30  |
| 41i  | 20  | 255 | 255 |

|  | R | G | B |
|---|---|---|---|
| 31a, | 20 | 15 | 30 |
| 41j | 255 | 255 | 30 |
| 41k | 20 | 15 | 255 |
| 41m | 20 | 15 | 255 |
| 41n | 255 | 255 | 30 |

FIG. 11

|  | R | G | B |
|---|---|---|---|
| 31a, | 20 | 15 | 30 |
| 41j | 20 | 255 | 255 |
| 41k | 255 | 15 | 30 |
| 41m | 255 | 15 | 30 |
| 41n | 20 | 255 | 255 |

FIG. 12

|     | R   | G   | B   |
|-----|-----|-----|-----|
| 31a,| 20  | 15  | 30  |
| 41j | 255 | 15  | 255 |
| 41k | 20  | 255 | 30  |
| 41m | 20  | 255 | 30  |
| 41n | 255 | 15  | 255 |

FIG. 13

|     | R  | G  | B  |
|-----|----|----|----|
| 31a,| 20 | 15 | 30 |
| 41a | 20 | 15 | 30 |
| 41b | 20 | 15 | 30 |
| 41c | 20 | 15 | 30 |
| 41d | 20 | 15 | 30 |
| 41e | 20 | 15 | 30 |
| 41f | 20 | 15 | 30 |
| 41g | 20 | 15 | 30 |
| 41h | 20 | 15 | 30 |
| 41i | 20 | 15 | 30 |

FIG. 14

|     | R  | G  | B  |
|-----|----|----|----|
| 31a, | 20 | 15 | 30 |
| 41j | 20 | 15 | 30 |
| 41k | 20 | 15 | 30 |
| 41m | 20 | 15 | 30 |
| 41n | 20 | 15 | 30 |

METHOD OF REDUCING THE AMOUNT OF BLACK IN AN IMAGE

BACKGROUND OF THE INVENTION

1. Field of the Invention

The present invention relates to a method of reducing the amount of black in an image, such that a printer can print the image without or with only a little black ink (or toner).

2. Description of the Related Art

Generally, a common printer performs an automatic determination of an image for being printed according to a print command sent from a user end computer, after which it accordingly mixes in black ink (or toner) to achieve a gray-scale effect, thereby saving the consumption of color ink (or toner) as well as achieving a better shadow detail effect. However, for certain situations, an image printed with black ink (or toner) is not desired. For example, when a user utilizes an optical pen (also known as an optical index/optical identification (OID) pen) to read a speech-purpose print code (mostly in the form of very tiny 2D barcodes) on a certain image, the efficiency of the OID pen may be affected if the image itself also contains a lot of black, since the speech-purpose print code is printed completely or primarily in black.

In known prior art solutions, image processing software is utilized to convert the image from an RGB format into a CMYK format and to eliminate or reduce the K value in the CMYK format. However, one RGB value may correspond to multiple CMYK combinations. Therefore, when the converted image is sent to a printer end, the printer system will still process the remaining CMY values, and add a K value to obtain a shadow effect. Moreover, the printed image may look unbalanced because the K value (i.e. the shadow) of the original image is eliminated, while the brighter part remains unchanged.

Therefore, there is a need to provide a method of reducing the amount of black so as to completely avoid the conversion mechanism of adding the K value performed by the printer system, such that the user can obtain a printed image without or with only a little black ink (or toner), thereby mitigating and/or obviating the aforementioned problems.

SUMMARY OF THE INVENTION

It is an object of the present invention to provide a method of reducing the amount of black in an image.

To achieve the abovementioned objects, the method of reducing the amount of black in an image of the present invention comprises the following steps:

Reading an original digital image, which comprises P original pixels, wherein $1 \leq P \leq 9,000,000,000$, and each original pixel comprises three types of color information including the following: R color information referring to a red value; G color information referring to a green value; and B color information referring to a blue value, where:

$$0 \leq R \leq F, 0 \leq G \leq F, 0 \leq B \leq F, \text{ wherein } 2^4-1 \leq F \leq 2^{32}-1;$$

Preparing a digital image under conversion, which comprises N×N×P pixels under conversion, wherein N is 2 or 3, and each original pixel corresponds to N×N pixels under conversion; and generating color information of the N×N pixels under conversion corresponding to each original pixel, wherein at least N×N pixels under conversion corresponding to one original pixel have been through a black reduction process, and the color information of the corresponding N×N pixels under conversion meets at least one of the following conditions: $0.8 \times F \leq R \leq F$, $0.8 \times F \leq G \leq F$ or $0.8 \times F \leq B \leq F$.

If N=3, the color information of the nine corresponding pixels under conversion meets at least two of the following three conditions:

Condition 1: $(0.5 \times F \leq R \leq F$ and $0.8 \times F \leq G \leq F)$ or $(0.8 \times F \leq R \leq F$ and $0.5 \times F \leq G \leq F)$;

Condition 2: $(0.5 \times F \leq G \leq F$ and $0.8 \times F \leq B \leq F)$ or $(0.8 \times F \leq G \leq F$ and $0.5 \times F \leq B \leq F)$; and Condition 3: $(0.5 \times F \leq R \leq F$ and $0.8 \times F \leq B \leq F)$ or $(0.8 \times F \leq R \leq F$ and $0.5 \times F \leq B \leq F)$.

If N=2, the color information of the four corresponding pixels under conversion is characterized in that:

the color information of two of the four pixels under conversion meets at least one of the following three conditions:

Condition 1: $(0.5 \times F \leq R \leq F$ and $0.8 \times F \leq G \leq F)$ or $(0.8 \times F \leq R \leq F$ and $0.5 \times F \leq G \leq F)$;

Condition 2: $(0.5 \times F \leq G \leq F$ and $0.8 \leq B \leq F)$ or $(0.8 \times F \leq G \leq F$ and $0.5 \leq B \leq F)$; and Condition 3: $(0.5 \times F \leq R \leq F$ and $0.8 \leq B \leq F)$ or $(0.8 \times F \leq R \leq F$ and $0.5 \leq B \leq F)$;

and the color information of two of the four pixels under conversion meets at least one of the following conditions:

$$0.8 \times F \leq R \leq F, 0.8 \times F \leq G \leq F \text{ or } 0.8 \times F \leq B \leq F.$$

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIG. 4 illustrates a schematic drawing showing original pixels of an original digital image.

FIG. 5 provides a table showing the R, G and B color information of the original pixels according to one embodiment of the present invention.

FIG. 6 illustrates a schematic drawing showing pixels under conversion of a digital image under conversion according to the first embodiment of the present invention, wherein N=3.

FIG. 11 provides a table showing first color information of four pixels under conversion after passing through a black reduction process according to one embodiment of the present invention.

FIG. 12 provides a table showing second color information of four pixels under conversion after passing through a black reduction process according to one embodiment of the present invention.

FIG. 13 provides a table showing third color information of four pixels under conversion after passing through a black reduction process according to one embodiment of the present invention.

FIG. 14 provides a table showing color information of nine pixels under conversion without passing through a black reduction process according to one embodiment of the present invention.

DETAILED DESCRIPTION OF THE PREFERRED EMBODIMENT

Figure 1:
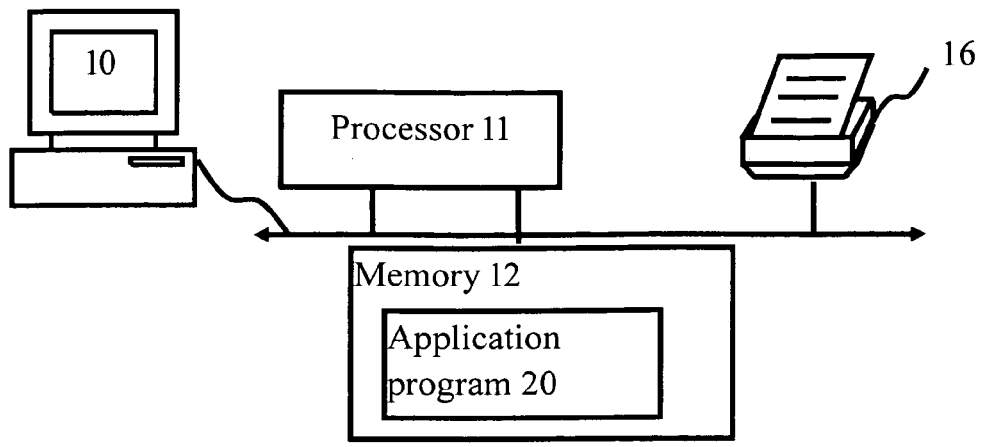
FIG. 1 illustrates an environmental schematic drawing according to a first embodiment of the present invention.

Please refer to FIG. 1, which illustrates an environmental schematic drawing according to a first embodiment of the present invention.

A user can utilize a personal computer 10 to execute the method of reducing the amount of black in an image of the present invention. The computer 10 mainly comprises a processor 11 and a memory 12. The memory 12 is stored with an application program 20. In the present invention, the processor 11 executes the application program 20 so as to generate and perform the steps of the present invention.

The computer 10 is connected to a printer 16 via either a wired connection or a wireless connection. The printer 16 is used for printing documents.

Figure 2:
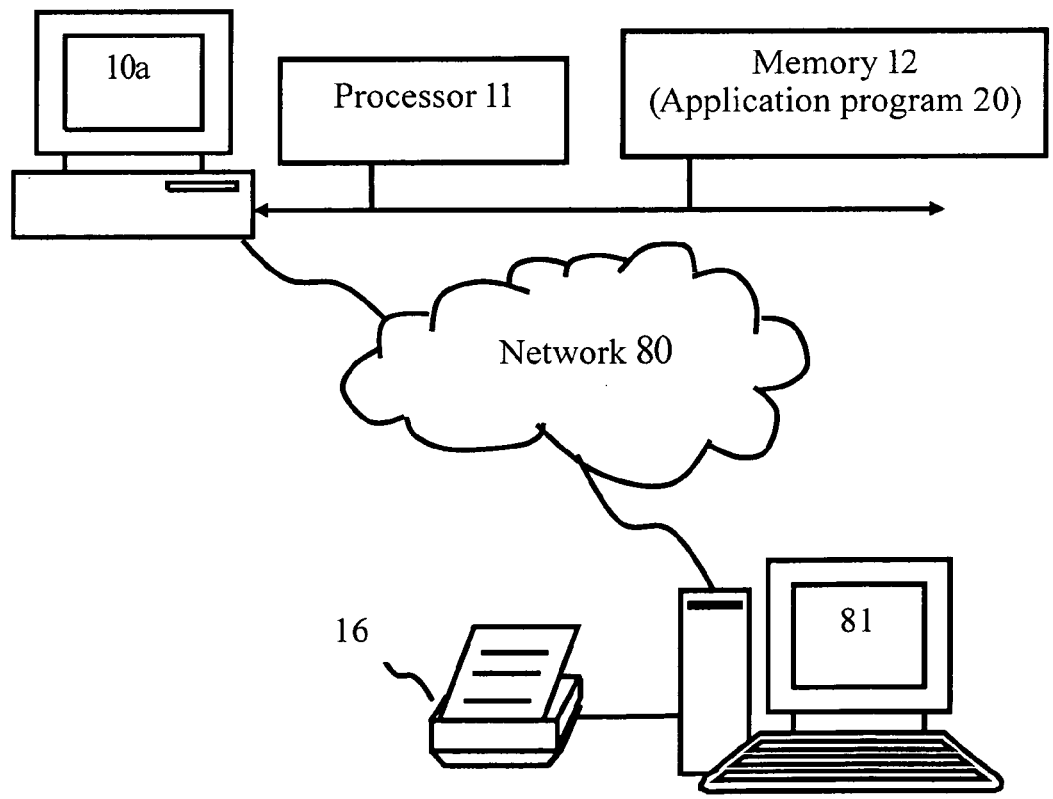
FIG. 2 illustrates an environmental schematic drawing according to a second embodiment of the present invention.

FIG. 2 illustrates an environmental schematic drawing according to a second embodiment of the present invention. The user utilizes a near-end computer 81 to connect to a computer 10a (such as a network server) via a network 80 (such as the internet), such that the near-end computer 81 can use the application program 20 of the network server 10a. In the second embodiment, the printer 16 is connected to the near-end computer 81 via either a wired connection or a wireless connection. The point of these two different embodiments is that the user can utilize the computer to execute the application program 20, and then utilize the printer 16 to print documents.

Figure 3:
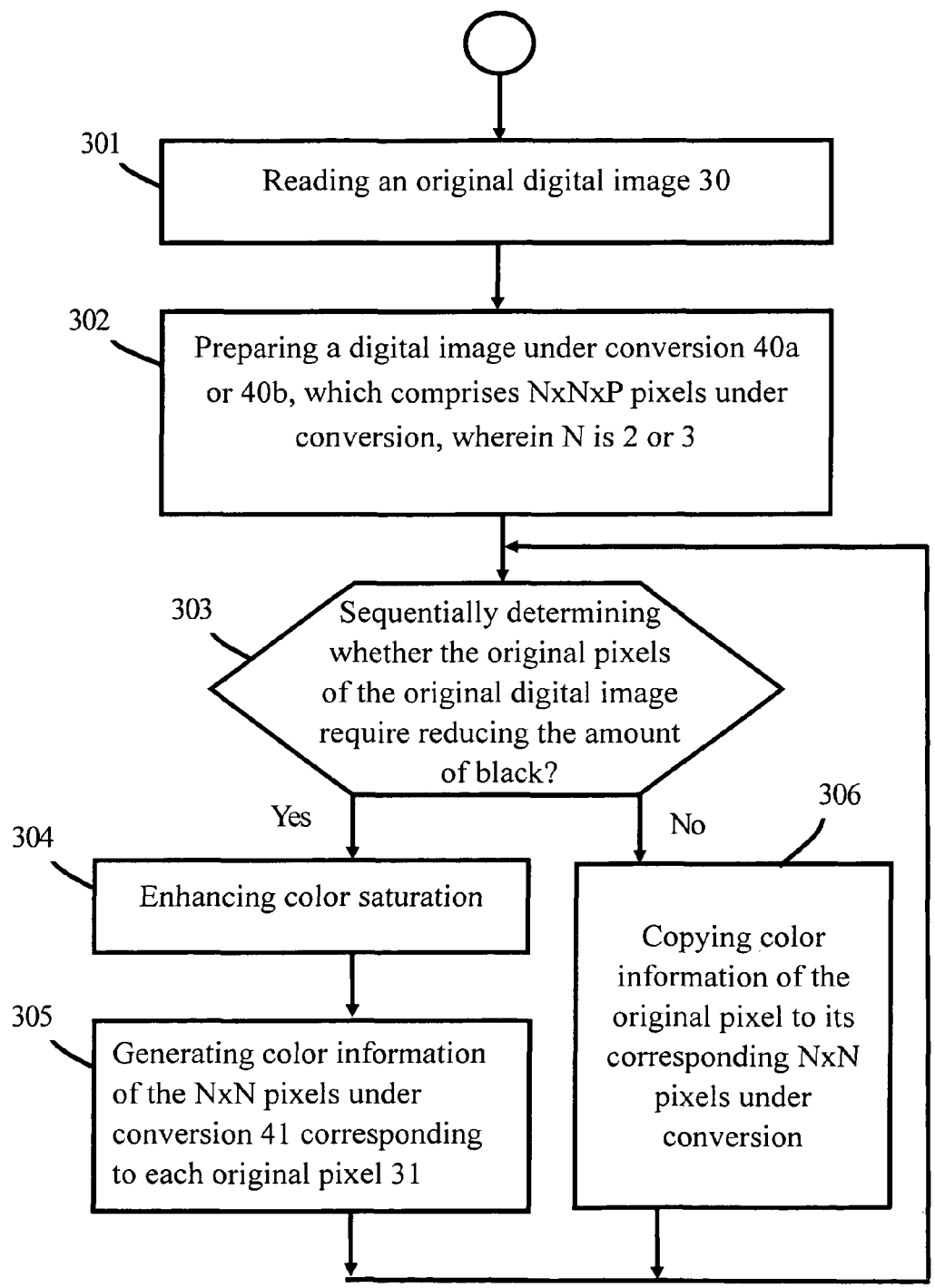
FIG. 3 illustrates a flowchart according to the present invention.

Please refer to FIG. 3, which illustrates a flowchart according to the present invention. Please also refer to FIGS. 1-2 as well as FIGS. 4-16 for a comprehensive understanding of the present invention.

Step 301: Reading an Original Digital Image 30.

The original digital image 30 comprises P original pixels 31, wherein $1 \leq P \leq 9,000,000,000$. A pixel is the minimum unit of a digital image (bitmap). For example, an 800×600 image is 800 pixels in width and 600 pixels in height. Therefore, an 800×600 digital image has a total of 800×600=480,000 pixels. Theoretically, P can be infinity; however, for current and foreseeable applications, it should be sufficient that P has a maximum of 9,000,000,000 to cover the usage of most digital images.

For example, the user can obtain a digital image from his/her computer or from a website for the application program 20 to read. Please note that the digital image may not be recorded in a bitmap format (e.g., it may be recorded in a compressed JPG format). If that is the case, the digital image needs to be converted into the bitmap format first. In step 301, the original digital image 30 can be a pre-processed digital image, such as an image converted from other formats, a reduced image, or an enlarged image.

Each original pixel 31 comprises three types of color information including the following: R color information referring to a red value; G color information referring to a green value; and B color information referring to a blue value. R, G and B are the three primary colors for being displayed on a screen. Generally, each of the color information is represented in 8 bits ranging from 0 to 255. Currently, the color information can be represented in 4 bits, 8 bits, or 16 bits. Or, it may even be represented in 32 bits in the future. Therefore:

$$0 \leq R \leq F, \ 0 \leq G \leq F, \ 0 \leq B \leq F, \text{ wherein } 2^4-1 \leq F \leq 2^{32}-1.$$

Please refer to FIG. 4, which illustrates a schematic drawing showing original pixels of an original digital image. For convenience's sake, in this embodiment, the original digital image 30 comprises four original pixels 31a, 31b, 31c and 31d, wherein each of the pixels comprises the R, G and B color information, as shown in FIG. 5.

Step 302: Preparing a digital image under conversion 40a or 40b, which comprises N×N×P pixels under conversion 41, wherein N is 2 or 3, and each of the original pixels 31 corresponds to N×N pixels under conversion 41.

If N=3, please refer to FIG. 6, wherein each original pixel corresponds to nine pixels under conversion 41.

Figure 7:
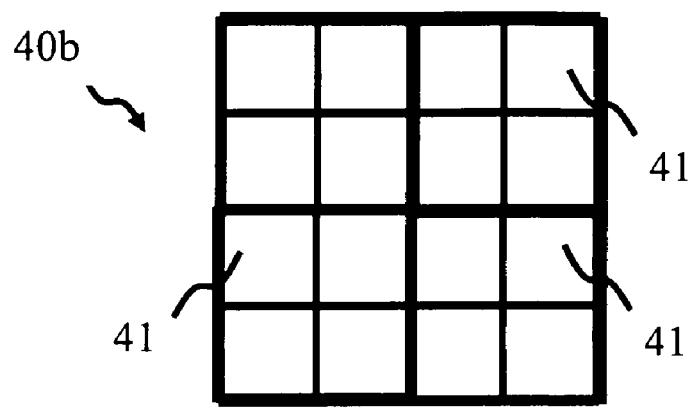
FIG. 7 illustrates a schematic drawing showing pixels under conversion of the digital image under conversion according to the second embodiment of the present invention, wherein N=2.

If N=2, please refer to FIG. 7, wherein each original pixel corresponds to four pixels under conversion 41.

Step 303: Sequentially determining whether the original pixels 31a, 31b, 31c and 31d of the original digital image 30 requires reducing the amount of black.

If yes, the method of the present invention performs step 304.

If no, the method of the present invention performs step 306.

For example, with regard to the original pixel 31a (RGB=22, 20, 30), because the brightness (12%) under its saturation (33%, i.e. "1-(the minimal color information/the maximal color information)") is lower than a certain preset lowest brightness value (78%) of a print apparatus for adding a K value, the K value needs to be eliminated.

With regard to the original pixel 31b (RGB=200, 190, 0), because the brightness (78%) under its saturation (100%) is higher than a certain preset lowest brightness value (55%) of a print apparatus for adding a K value, there is no need to eliminate the K value.

Step 304: Enhancing color saturation for the original pixel requiring reduction of the amount of black.

Because the color saturation will be lowered after performing the black reduction process (step 305), it is suggested that the color saturation be enhanced before step 305 is performed.

For example, the original color information of the original pixel 31a is: R=22, G=20 and B=30. After the color saturation enhancement, the color information becomes: R=20, G=15 and B=30. Because the technique of color saturation enhancement is a known prior art, there is no need for further description.

Step 305: Generating color information of the N×N pixels under conversion 41 corresponding to each original pixel 31, wherein at least N×N pixels under conversion 41 corresponding to one original pixel 31 that has been through the black reduction process.

Figure 8:
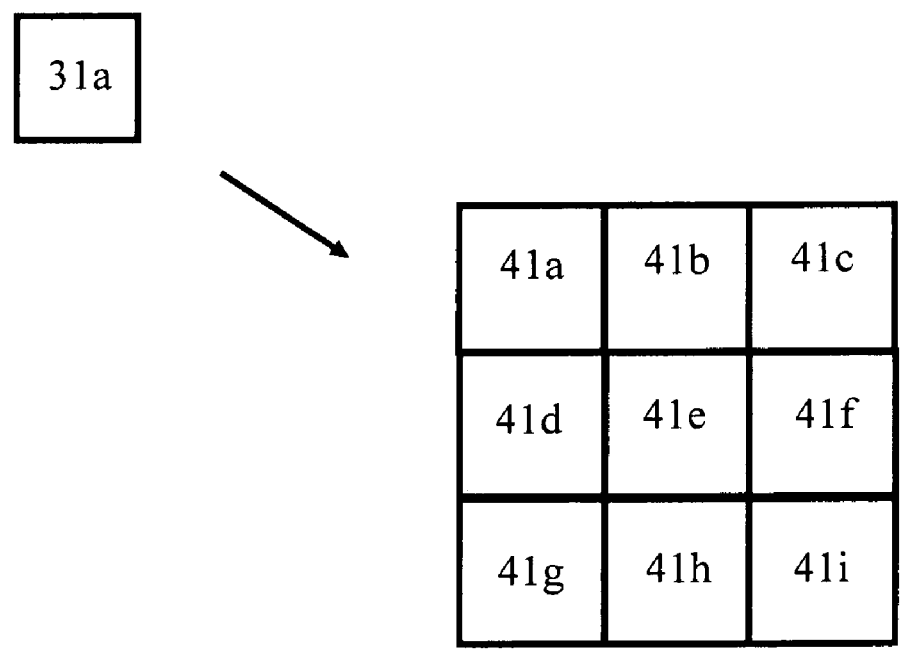
FIG. 8 illustrates a schematic drawing showing one original pixel corresponding to nine pixels under conversion according to one embodiment of the present invention, wherein N=3.

Take the original pixel 31a after color saturation enhancement as an example, wherein R=20, G=15 and B=30:

If N=3:

Please refer to FIG. 8, which illustrates a schematic drawing showing the original pixel 31a corresponding to nine pixels under conversion 41a~41i. Please also refer to FIG. 9 for their color information.

The color information of the three pixels under conversion 41a, 41f and 41h is characterized as R=F and G=F, while their B values are equal to the B value of the original pixel 31a.

The color information of the three pixels under conversion 41b, 41d and 41i is characterized as G=F and B=F, while their R values are equal to the R value of the original pixel 31a.

The color information of the three pixels under conversion 41c, 41e and 41g is characterized as B=F and R=F, while their G values are equal to the G value of the original pixel 31a.

Figures 9, 10:
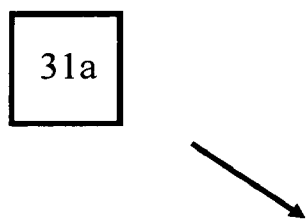
FIG. 9 provides a table showing the color information of nine pixels under conversion after passing through a black reduction process according to one embodiment of the present invention.
FIG. 10 illustrates a schematic drawing showing one original pixel corresponding to four pixels under conversion according to one embodiment of the present invention, wherein N=2.

As shown in FIG. 9, in this embodiment, each of the original RGB values of the original pixel 31a is represented as three pixels under conversion. Because the color information of each pixel under conversion 41a~41i has two full values (equal to F), the K value will not be shown during a printing process (wherein the printer will be converted to a CMYK format).

As shown in FIG. 9, it is ensured that the K value will be eliminated in this embodiment, which is applicable for all types of print apparatuses. However, if the object is to reduce the K value, and each type of print apparatuses has its own conversion conditions, then the color information of the corresponding N×N (i.e. nine, if N=3) pixels under conversion meets at least two of the following three conditions:

Condition 1: (0.5×F≦R≦F and 0.8×F≦G≦F) or (0.8×F≦R≦F and 0.5×F≦G≦F);

Condition 2: (0.5×F≦G≦F and 0.8×F≦B≦F) or (0.8×F≦G≦F and 0.5×F≦B≦F); and

Condition 3: (0.5×F≦R≦F and 0.8×F≦B≦F) or (0.8×F≦R≦F and 0.5×F≦B≦F).

For example:

The color information of the three pixels under conversion 41a, 41f and 41h is characterized as R=0.5×F and G=0.8×F, while their B values are equal to the B value of the original pixel 31a.

The color information of the three pixels under conversion 41b, 41d and 41i is characterized as G=0.5×F and B=0.8×F, while their R values are equal to the R value of the original pixel 31a.

The color information of the three pixels under conversion 41c, 41e and 41g is characterized as B=0.8×F and R=0.5×F, while their G values are equal to the G value of the original pixel 31a.

After a practical experiment, if one of the RGB color information data of a pixel under conversion equals to or exceeds 0.5×F, and another equals to or exceeds 0.8×F, the object of reducing the K value can be achieved because it is assured that the brightness will be greater than or equal to 80% under any circumstances.

If N=2, please refer to a first embodiment described hereinafter:

Please refer to FIG. 10, which illustrates a schematic drawing showing the original pixel 31a corresponding to four pixels under conversion 41j~41n. Please also refer to FIG. 11 for their color information.

The color information of the two pixels under conversion 41j and 41n is characterized as R=F and G=F, while their B values are equal to the B value of the original pixel 31a.

The color information of the two pixels under conversion 41k and 41m is characterized as B=F, while their R values and G values are equal to the R value and G value of the original pixel 31a.

That is, the B value of the original pixel 31a is represented as two pixels under conversion, while the R value and the G value of the original pixel 31a are represented as another two pixels under conversion. Because the color information of each pixel under conversion 41j~41n has at least one full value (equal to F), the K value will not be shown during a printing process (wherein the printer will be converted to a CMYK system). As shown in FIG. 11, it is ensured that the K value will be eliminated in this embodiment. However, if the object is to reduce the K value, the method of the present invention will work similarly to what is described if N=3. That is:

The color information of the two pixels under conversion 41j and 41n is characterized as (0.5×F≦R≦F and 0.8×F≦G≦F) or (0.8×F≦R≦F and 0.5×F≦G≦F), while their B values are equal to the B value of the original pixel 31a.

The color information of the two pixels under conversion 41k and 41m is characterized as 0.8×F≦B≦F, while their R values and G values are equal to the R value and G value of the original pixel 31a.

If N=2, please refer to a second embodiment described hereinafter:

Please refer to FIG. 10, which illustrates a schematic drawing showing the original pixel 31a corresponding to four pixels under conversion 41j~41n. Please also refer to FIG. 12 for their color information.

The color information of the two pixels under conversion 41j and 41n is characterized as G=F and B=F, while their R values are equal to the R value of the original pixel 31a.

The color information of the two pixels under conversion 41k and 41m is characterized as R=F, while their G values and B values are equal to the G value and B value of the original pixel 31a.

That is, the R value of the original pixel 31a is represented as two pixels under conversion, while the G value and the B value of the original pixel 31a are represented as another two pixels under conversion. Because the color information of each pixel under conversion 41j~41n has at least one full value (equal to F), the K value will not be shown during a printing process (wherein the printer will be converted to a CMYK system). As shown in FIG. 12, it is ensured that the K value will be eliminated in this embodiment. However, if the object is to reduce the K value, the method of the present invention will work similarly to what is described if N=3. That is:

The color information of the two pixels under conversion 41j and 41n is characterized as (0.5×F and 0.8×F≦B≦F) or (0.8×F≦G≦F and 0.5×F≦B≦F), while their R values are equal to the R value of the original pixel 31a.

The color information of the two pixels under conversion 41k and 41m is characterized as 0.8×F≦R≦F, while their G values and B values are equal to the G value and B value of the original pixel 31a.

If N=2, please refer to a third embodiment described hereinafter:

Please refer to FIG. 10, which illustrates a schematic drawing showing the original pixel 31a corresponding to four pixels under conversion 41j~41n. Please also refer to FIG. 13 for their color information.

The color information of the two pixels under conversion 41j and 41n is characterized as B=F and R=F, while their G values are equal to the G value of the original pixel 31a.

The color information of the two pixels under conversion 41k and 41m is characterized as G=F, while their B values and R values are equal to the B value and R value of the original pixel 31a.

That is, the G value of the original pixel 31a is represented as two pixels under conversion, while the B value and the R value of the original pixel 31a are represented as another two pixels under conversion. Because the color information of each pixel under conversion 41j~41n has at least one full value (equal to F), the K value will not be shown during a printing process (wherein the printer will be converted to a CMYK system). As shown in FIG. 13, it is assured that the K value will be eliminated in this embodiment. However, if the object is to reduce the K value, the method of the present invention will work similarly to what is described if N=3. That is:

The color information of the two pixels under conversion 41j and 41n is characterized as (0.5×F≦R≦F and 0.8×F≦B≦F) or (0.8×F≦R≦F and 0.5×F≦B≦F), while their G values are equal to the G value of the original pixel 31a.

The color information of the two pixels under conversion 41k and 41m is characterized as 0.8×F≦G≦F, while their R values and B values are equal to the R value and B value of the original pixel 31a.

Step 306: Directly copying color information of the original pixel to its corresponding N×N pixels under conversion because there is no need for the black reduction process.

If N=3: please refer to FIG. 14, which provides a table showing the color information of the original pixel 31a corresponding to that of nine pixels under conversion 41a~41i.

Figures 15, 16:
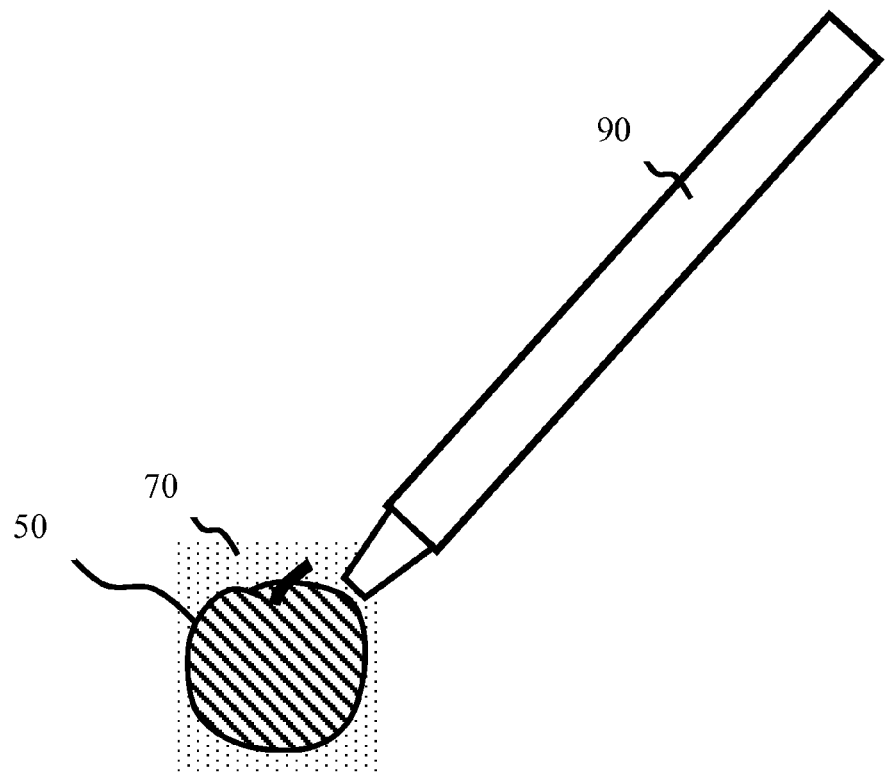
FIG. 15 provides a table showing color information of four pixels under conversion without being through the amount of black reduction process according to one embodiment of the present invention.
FIG. 16 illustrates a schematic drawing showing an OID pen reading a speech-purpose print code.

If N=2, please refer to FIG. 15, which provides a table showing the color information of the original pixel 31a corresponding to that of four pixels under conversion 41j~41n.

According to the abovementioned steps, the digital image under conversion 40a or 40b would become a converted digital image 50. Because the black of the original digital image 30 has been eliminated or reduced in amount, its printout can, for example, be read by an optical pen 90. The optical pen 90 is also known as an optical index/optical identification (OID) pen. Because the hardware is a known device, there is no need for further description. Please refer to FIG. 16. A speech-purpose print code 70 and the converted digital image 50 are printed on the same location. Although the speech-purpose print code 70 is still printed in black, the efficiency of utilizing the optical pen 90 to read the speech-purpose print code 70 can be significantly increased because the black of the converted digital image 50 has been eliminated or reduced in amount.

Although the present invention has been explained in relation to its preferred embodiments, it is to be understood that many other possible modifications and variations can be made without departing from the spirit and scope of the invention as hereinafter claimed. For example, step 303 is not necessary. That is, all pixels can be processed by step 305, such that the processed image would have more even brightness (because the brightness would be increased consistently). Otherwise, if some pixels are processed by step 305 (generally the brightness would be increased), and other pixels are processed by step 306 (the brightness and color remain unchanged), it might result in uneven brightness.

What is claimed is:

1. A method of reducing an amount of black in an image, utilizing a computer to reduce or eliminate an amount of black in an original digital image, so as to obtain a converted digital image, the method comprising the following steps:

reading the original digital image, which comprises P original pixels, wherein $1 \leq P \leq 9{,}000{,}000{,}000$, and each original pixel comprises three types of color information including the following: R color information referring to a red value; G color information referring to a green value; and B color information referring to a blue value, where:

$0 \leq R \leq F$, $0 \leq G \leq F$, $0 \leq B \leq F$, wherein $2^4 - 1 \leq F \leq 2^{32} - 1$;

preparing a digital image under conversion, which comprises N×N×P pixels under conversion, wherein N is 2 or 3, and each original pixel corresponds to N×N pixels under conversion; and generating color information of the N×N pixels under conversion corresponding to each original pixel, wherein at least N×N pixels under conversion corresponding to one original pixel have passed through a black reduction process, and the color information of the corresponding N×N pixels under conversion meets at least one of the following conditions:

$0.8 \times F \leq R \leq F$, $0.8 \times F \leq G \leq F$, or $0.8 \times F \leq B \leq F$;

thereby obtaining a converted digital image after completing the color information of the digital image under conversion.

2. The method of reducing the amount of black in an image as claimed in claim 1, wherein if N=3, the color information of the pixels under conversion meets at least two of the following three conditions:

condition 1: (0.5×F≦R≦F and 0.8×F≦G≦F) or (0.8×F≦R≦F and 0.5×F≦G≦F);

condition 2: (0.5×F≦G≦F and 0.8×F≦B≦F) or (0.8×F≦G≦F and 0.5×F≦B≦F); and condition 3: (0.5×F≦R≦F and 0.8×F≦B≦F) or (0.8×F≦R≦F and 0.5×F≦B≦F).

3. The method of reducing the amount of black in an image as claimed in claim 2, wherein the color information of the nine corresponding pixels under conversion is characterized in that:

the color information of three of the pixels under conversion is characterized as (0.5×F≦R≦F and 0.8×F≦G≦F) or (0.8×F≦R≦F and 0.5×F≦G≦F);

the color information of three of the pixels under conversion is characterized as (0.5×F≦G≦F and 0.8×F≦B≦F) or (0.8×F≦G≦F and 0.5×F≦B≦F); and the color information of three of the pixels under conversion is characterized as (0.5×F≦B≦F and 0.8×F≦R≦F) or (0.8×F≦B≦F and 0.5×F≦R≦F).

4. The method of reducing the amount of black in an image as claimed in claim 3, wherein the color information of the nine corresponding pixels under conversion is characterized thus:

the color information of three of the pixels under conversion is characterized as R=F and G=F;

the color information of three of the pixels under conversion is characterized as G=F and B=F; and the color information of three of the pixels under conversion is characterized as B=F and R=F.

5. The method of reducing the amount of black in an image as claimed in claim 1, wherein if N=2, the color information of the four corresponding pixels under conversion is characterized thus:

the color information of two of the pixels under conversion meets at least one of the following three conditions:

condition 1: $(0.5 \times F \leq R \leq F$ and $0.8 \times F \leq G \leq F)$ or $(0.8 \times F \leq R \leq F$ and $0.5 \times F \leq G \leq F)$;

condition 2: $(0.5 \times F \leq G \leq F$ and $0.8 \leq B \leq F)$ or $(0.8 \times F \leq G \leq F$ and $0.5 \leq B \leq F)$; and condition 3: $(0.5 \times F \leq R \leq F$ and $0.8 \leq B \leq F)$ or $(0.8 \times F \leq R \leq F$ and $0.5 \leq B \leq F)$;

and the color information of two of the pixels under conversion meets at least one of the following conditions:

$$0.8 \times F \leq R \leq F, \ 0.8 \times F \leq G \leq F \text{ or } 0.8 \times F \leq B \leq F.$$

6. The method of reducing the amount of black in an image as claimed in claim 5, wherein if N=2, the color information of the four corresponding pixels under conversion is characterized thus:

the color information of two of the pixels under conversion is characterized as $(0.5 \times F \leq R \leq F$ and $0.8 \times F \leq G \leq F)$ or $(0.8 \times F \leq R \leq F$ and $0.5 \times F \leq G \leq F)$; and the color information of two of the pixels under conversion is characterized as $0.8 \times F \leq B \leq F$.

7. The method of reducing the amount of black in an image as claimed in claim 6, wherein if N=2, the color information of the four corresponding pixels under conversion is characterized thus:

the color information of two of the pixels under conversion is characterized as R=F and G=F; and the color information of two of the pixels under conversion is characterized as B=F.

8. The method of reducing the amount of black in an image as claimed in claim 5, wherein if N=2, the color information of the four corresponding pixels under conversion is characterized thus:

the color information of two of the pixels under conversion is characterized as $(0.5 \times F \leq G \leq F$ and $0.8 \times F \leq B \leq F)$ and $(0.8 \times F \leq G \leq F$ and $0.5 \times F \leq B \leq F)$; and the color information of two of the pixels under conversion is characterized as $0.8 \times F \leq R \leq F$.

9. The method of reducing the amount of black in an image as claimed in claim 6, wherein if N=2, the color information of the four corresponding pixels under conversion is characterized thus:

the color information of two of the pixels under conversion is characterized as G=F and B=F; and the color information of two of the pixels under conversion is characterized as R=F.

10. The method of reducing the amount of black in an image as claimed in claim 5, wherein if N=2, the color information of the four corresponding pixels under conversion is characterized thus:

the color information of two of the pixels under conversion is characterized as $(0.5 \times F \leq B \leq F$ and $0.8 \times F \leq R \leq F)$ or $(0.8 \times F \leq B \leq F$ and $0.5 \times F \leq R \leq F)$; and the color information of two of the pixels under conversion is characterized as $0.8 \times F \leq G \leq F$.

11. The method of reducing the amount of black in an image as claimed in claim 6, wherein if N=2, the color information of the four corresponding pixels under conversion is characterized thus:

the color information of two of the pixels under conversion is characterized as B=F and R=F; and the color information of two of the pixels under conversion is characterized as G=F.

* * * * *